United States Patent

[11] 3,553,470

[72] Inventors Michael J. Dench; Rowland Clive Robbins, Bedford, England

[21] Appl. No. 713,507
[22] Filed Mar. 15, 1968
[45] Patented Jan. 5, 1971
[73] Assignee George Richards & Company Limited
[32] Priority Mar. 16, 1967
[33] Great Britain
[31] 12496/67

[54] APPARATUS FOR GENERATING AN APPROXIMATION TO A SINE WAVE INCLUDING A READING HEAD WITH TWO SPACED AREAS FOR SCANNING AN OPTICAL GRATING
12 Claims, 5 Drawing Figs.

[52] U.S. Cl. .......... 250/237, 250/239
[51] Int. Cl. .......... H01j 5/16
[50] Field of Search .......... 250/232, 237, 233; 356/169, 170; 350/273, 279

[56] References Cited

FOREIGN PATENTS 846,771 8/1960 Great Britain .......... 250/233

*Primary Examiner*—James W. Lawrence
*Assistant Examiner*—V. Lafranchi
*Attorney*—Holcombe, Wetherill & Brisebois

ABSTRACT: The invention is concerned with a reading head for moving in relation to an optical grating for giving a position signal. The position signal may be made very nearly the true sine wave by appropriate choice of the spacing between apertures in the head in relation to the pitch of the grating and/or by appropriate shape of the apertures.

INVENTORS
MICHAEL J. DENCH.
ROWLAND C. ROBBINS.
BY
Holcombe, Wetherill & Brisebois
ATTORNEYS INVENTORS
MICHAEL J. DENCH
ROWLAND C. ROBBINS
BY
Holcombe, Wetherill & Brisebois
ATTORNEYS

APPARATUS FOR GENERATING AN APPROXIMATION TO A SINE WAVE INCLUDING A READING HEAD WITH TWO SPACED AREAS FOR SCANNING AN OPTICAL GRATING

This invention relates to a method and apparatus for generating an approximation to a sine wave, and one application is in the use of a ruled optical grating for giving an output signal dependent upon the relative positions of the grating and a reading head. The present invention enables a positional signal to be provided directly in the form of an approximation to a sine wave rather than in the form of a triangular or trapezoidal wave and this may have a considerable advantage in so far as apparatus for using the positional signal will not have to handle harmonics of the fundamental frequency of more than very small amplitude.

According to the present invention, in apparatus for generating an approximation to a sine wave a reading head is movable in relation to an optical grating and contains means defining two spaced local areas of the grating for examination, the local areas being spaced apart by an odd number of $n^{th}$ fractional parts of half the pitch of the grating, and includes means arranged to combine signals derived from examination of the respective local areas to provide a combined approximately sinusoidal signal from which the $n^{th}$ harmonic of the fundamental frequency has been substantially eliminated. The means defining the local areas may comprise a pair of apertures. The grating may consist of alternate lines and spaces or dark and light regions of approximately rectangular shape.

Thus, if an aperture is rectangular and one-third of a grating pitch in width, the waveform generated would be trapezoidal and of the form expressed by the infinite Fourier+ Series.

$S = K \sin \Phi - 1/5^2 \sin 5\Phi + 1/7^2 \sin 7\Phi - 1/11^2 \sin 11\Phi +$.

This has no third harmonic component but the amplitude of the fifth harmonic component is 4 percent of that of the fundamental. By arranging a second similar rectangular aperture an odd number of tenths of a grating pitch, preferably nine-tenths or eleven-tenths of a grating pitch, displaced from the first, complete cancellation of the fifth harmonic is again achieved, and the residual seventh harmonic will have an amplitude of only about 2 percent of that of the fundamental. In this case $n$ would be five.

In that arrangement, the third harmonic is eliminated by choice of the width of the local rectangular area in relation to the rectangular grating pitch, but according to another aspect of the present invention a method of generating an approximation to a sine wave involves the movement of a rectangle in relation to a symmetrical trapezium, and the generation of a signal proportional to the overlapping areas of the rectangle and trapezium. In general the movement will be parallel with the parallel sides of the trapezium.

As the trapezium shape first encounters the rectangle shape, the overlapping area will originally increase with the square of the distance moved, until when the leading inclined edge of the trapezium is wholly over the rectangle the rate of increase in overlapping area will be linear as the shorter of the parallel sides moves into register with the rectangle. Finally as the trailing inclined side comes into register, the rate of increase of overlapping area will again be according to a square law but will increase at a reducing rate rather than at an increasing rate.

When the trapezium is wholly over the rectangle the rate of increase will be zero and the maximum of the approximate sine wave will have been achieved. Further movement of the trapezium causes the leading inclined edge to move off the rectangle so that the area reduces to give an output signal corresponding to the trailing edge of an approximation to a sine wave.

A close approximation to a sine wave is achieved if the length of the parallel sides of the trapezium are in the ratio of 1:3 and if the longer of the parallel sides is equal to the width of the rectangle.

The shapes may be apertures in opaque surfaces for example a rectangular reference aperture and a trapezium shaped head aperture so that the position of the head in relation to the reference surface can be given by the instantaneous value of the sine wave generated.

Generation is conveniently obtained by means of a lamp and photoelectric cell which is responsive to the quantity of light falling through the overlapping areas of trapezium and rectangle so that the electrical output of the cell will be the required signal.

Either the rectangle or the trapezium may be one of a number of similar apertures in a grating, and conveniently a long grating has rectangular apertures which cooperate in turn with the trapezium aperture in a moving head to produce a repeating sine wave as the head moves. The instantaneous position of the head can be determined by the amplitude of the sine wave in a cycle while the number of cycles can be counted from a reference position.

The invention includes apparatus for generating an approximation to a sine wave in the manner described and in particular includes a position signal determining apparatus including an elongated grating having rectangular or trapezium shaped apertures and a relatively movable head having a trapezium shaped or rectangular aperture together with optical means for determining the instantaneous overlapping areas of rectangle and trapezium. The pitch of such a grating is conveniently twice the width of the rectangle or of the length of the longer parallel side of the trapezium. In a preferred embodiment of the invention the aperture is in the shape of a double trapezium one part being a mirror image of the other about the longer of the parallel sides. This arrangement is less adversely affected by accidental "skew" or misalignment of the center lines of the rectangles and trapezia.

The waveform generated by a trapezium shaped aperture of the proportions described above and in cooperation with a grating having lines and spaces of equal width may be expressed as an infinite Fourier Series.

$S = K \sin \Phi - 1/5^3 \sin 5\Phi - 1/7^3 \sin 7\Phi + 1/11^3 \sin 11\Phi +$ from which it may be seen that there is no third harmonic and that the amplitude of the fifth harmonic is only 0.8 percent of the amplitude of the fundamental. If instead of using only one trapezium aperture per sensing channel two such apertures are used and these are spaced, not by exactly one grating pitch, but by an odd number of tenths of a grating pitch preferably nine-tenths or eleven-tenths of a grating pitch as described in relation to the first embodiment, the fifth harmonic contributions from the two apertures will be half a period out of phase with each other and will therefore cancel, thus giving a resultant waveform even more closely approximating to a pure sine wave.

It is clear that by using additional apertures and different mutual spacings it is possible to cancel out the effect of higher order harmonics also.

The invention has application to the position signal determining system and apparatus the subject of U.S. Pat. No. 3,122,686 used for determining the position of a movable member on a machine tool.

Also the invention has a relationship to the invention which is the subject of Pat. application Ser. No. 713,342, filed Mar. 15, 1968 the subject of which is an arrangement of a lamp and photocells enabling the minimum illumination of a number of cells to be balanced without affecting the area of the sensitive surface of the photocells on which an image of a grating aperture is projected. Where overlapping aperture and grating element are both rectangular as in patent specification No. 3,122,686 it does not matter if the size of the image is reduced by mutual displacement perpendicular to the grating along the axis, but where an approximation to a sine wave is being generated in the manner described by use of a trapezium shaped aperture, the signal would cease to be a close approximation to a sine wave if the image area on the photocell were reduced in this way.

The invention applies equally to a system utilizing the cooperation of a set of apertures with a reflection type of grating.

The invention may be carried into practice in various ways and one embodiment will now be described by way of example with reference to the accompanying drawings, in which.

Figure 1:
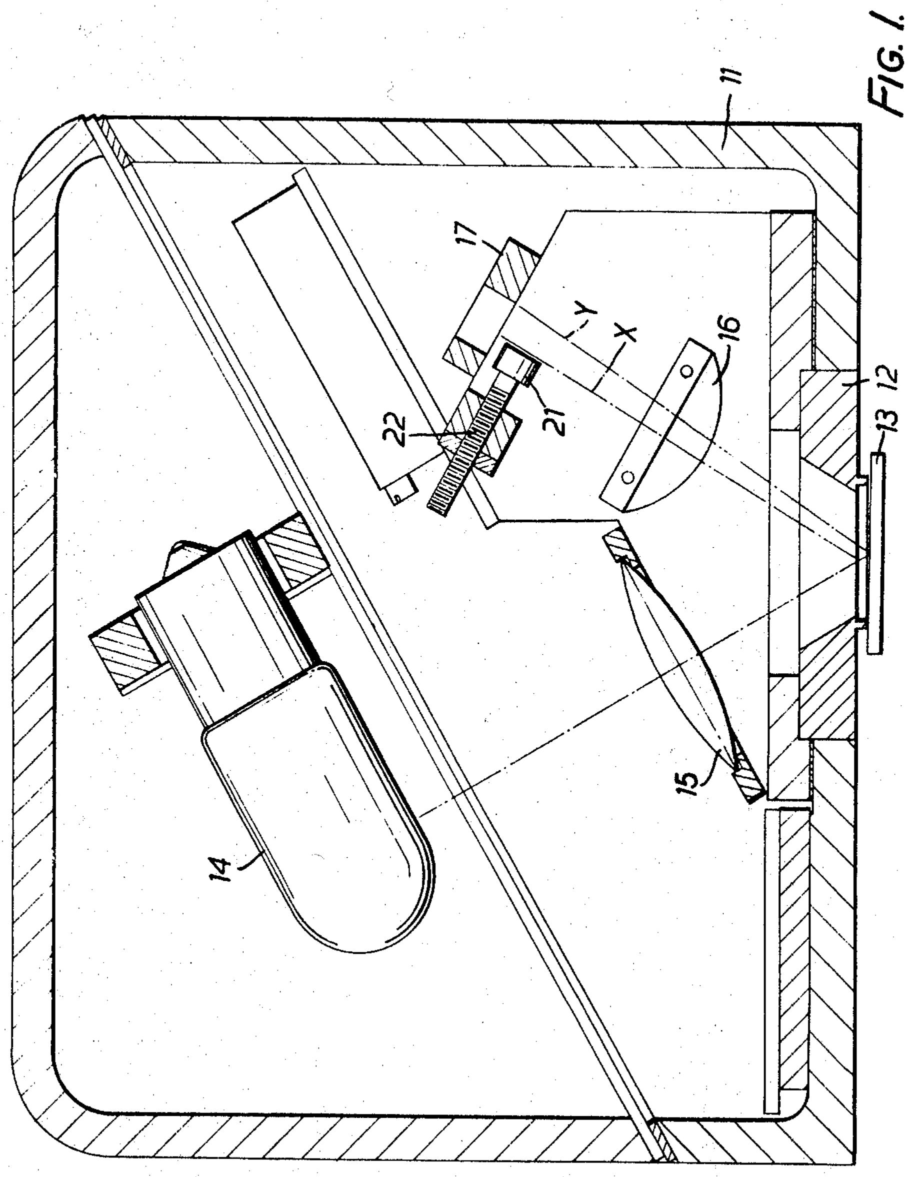
FIG. 1 is a section through a reading head embodying the invention.

The head comprises a light tight housing 11 carrying a cursor 12 capable of moving with the housing over a grating 13 along the length of the grating, which is perpendicular to the plane of FIG. 1.

The grating 13 is ruled with alternate dark lines and reflecting spaces, and light from the single lamp 14 in the light tight housing 11 is focused by a lens 15 on to the upper surface of the grating whence it is reflected through collimating means 16 on to the photosensitive surfaces of four photosensitive detectors indicated generally at 17. Each detector 'looks' at a different portion of the grating 13, the portions being defined by four pairs of apertures 18 in the cursor 12, each pair corresponding to two lines of the grating, the different apertures being phase displaced in relation to the grating as described in more detail in U.S. Pat. Ser. No. 3,122,686.

When the two slots comprising one pair of apertures 18 (FIG. 2) are over lines in the grating, the corresponding photocell 17 will receive minimum illumination but when the slots are over the spaces between lines in the grating, the cell will receive maximum illumination, and it is important that the minimum and maximum, or dark and light, currents from the four detectors shall be balanced.

Figures 2, 3, 4, 5:
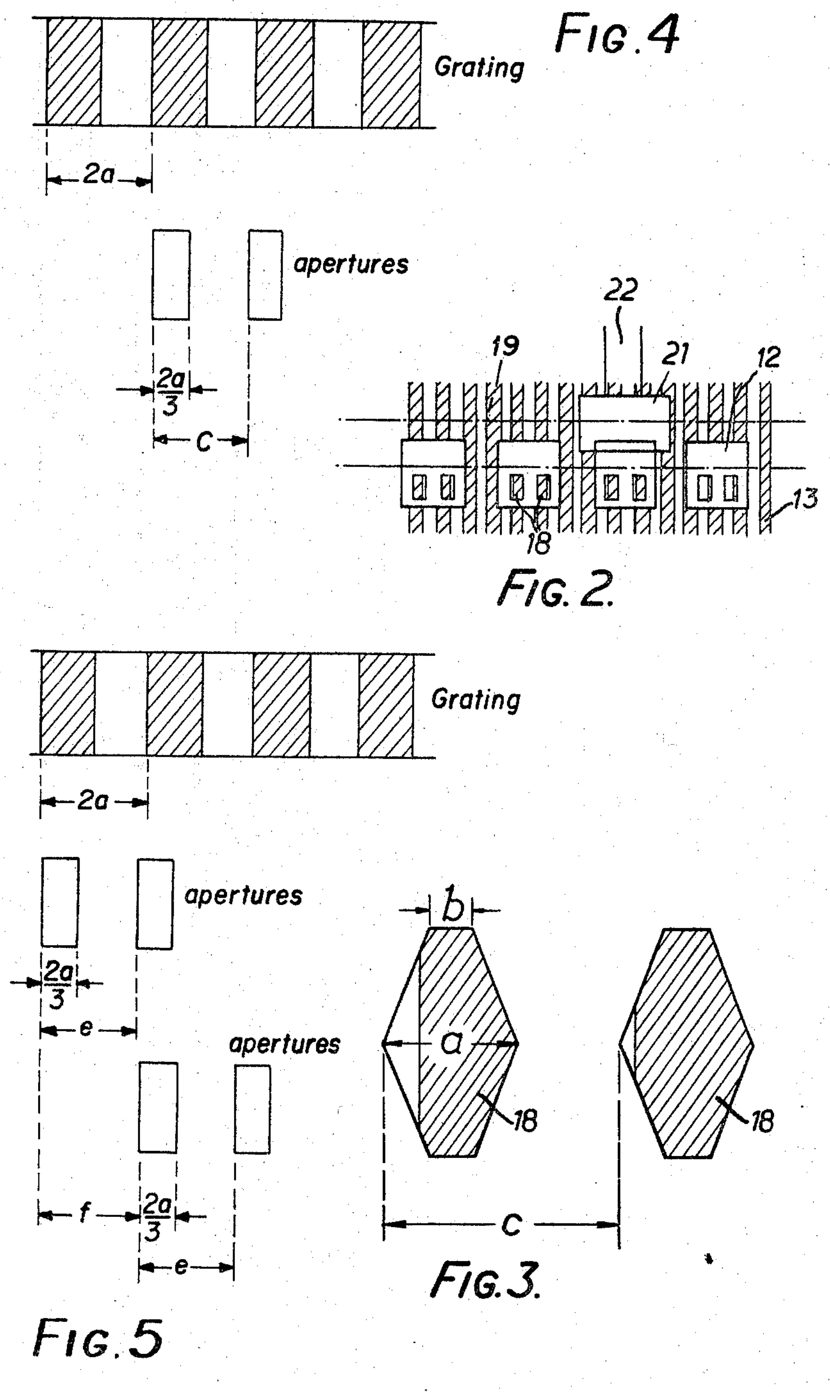
FIG. 2 shows diagrammatically the photosensitive areas of the four photosensitive detectors in the head of FIG. 1.
FIG. 3 shows one arrangement of apertures for spacial modulation of light for the detectors.
FIG. 4 illustrates the position of the rectangular openings with respect to the lines of the grating, to eliminate the third harmonic.
FIG. 5 illustrates the position of the apertures in the cursor with respect to the grating lines, to eliminate the seventh harmonic.

The cursor 12 is tilted a little from the plane of the grating 13 so that light from the lamp 14 is reflected from its upper surface as shown at X on to the four sensitive surfaces of the detectors 17 in a light band shown generally at 19 in FIG. 2. This band covers a part of the photosensitive surfaces displaced from the part where the images of the apertures 18 modulated by the grating appear as shown in FIG. 2 and at Y in FIG. 1. The angle of tilt may be about 1°.

Each detector 17 has its individual opaque stop 21 carried on the end of an adjusting screw 22 and controlling the amount of light from the band 19 which falls on the sensitive area of the detector, so that the detectors can be individually adjusted until the dark currents when the apertures are over lines in the grating are the same for all detectors.

The light currents, when the apertures are over the reflecting spaces in the grating, can be adjusted to be the same for all four detectors 17 by electrical means in the output circuits from the photocells.

It is clear that a change in the brightness of the lamp 14 will affect all the minima and maxima settings of the detectors equally so that the position information contained in the output signal will be independent of such variations and could also be independent of the replacement of a lamp.

Moreover, the minima adjustments are achieved without interfering with the area of the sensitive surface upon which light through the cursor apertures falls and this gives the head a controllable range of modulation between light and dark to give higher resolutions. Moreover, by appropriate positioning of the band of reflected and modulated light, the images from the grating through the cursor apertures can be permitted to wander a little without affecting the balance settings.

One arrangement of the two apertures 18 in the cursor 12 for each detector 17 is shown in FIG. 3.

The two apertures 18 are spaced apart with a pitch $c$ equal to nine-tenths (or eleven-tenths) $\times 2a$ where $2a$ is the pitch of the lines in the grating. The width of each aperture is conveniently equal to $a$, i.e. half the grating pitch.

This spacing of the apertures 18 helps to eliminate fifth harmonic components in the signal from the detectors 17, since the fifth harmonic contributions from the two apertures will be half a period out of phase with each other. The output will thus more closely approximate to the sine of the fundamental frequency.

The apertures could be rectangular with a width equal to one third of a grating pitch as shown in FIG. 4 to cancel out the third harmonic component and with the same aperture pitch $c$ = nine-tenths $\times 2a$ (FIG. 4) or eleven-tenths $\times 2a$ to cancel out the fifth harmonic component. If the aperture pitch $c$ in FIG. 4 were (say) eleven-fourteenths $\times 2a$ or thirteen-fourteenths $\times 2a$, the seventh harmonic rather than the fifth harmonic would be eliminated. Of course the apertures could be trapezium-shaped instead of rectangular to eliminate the third harmonic.

However the double trapezoidal aperture of FIG. 3 has the advantage that the fifth harmonic component can be canceled out as described above, and also the advantage that the seventh harmonic component has an amplitude of only 0.8 percent of the fundamental.

This figure 0.8 percent is achieved with a grating pitch of $2a$ if the space between lines of the grating is rectangular with a width $a$ and if the ratio $a : b$ is equal to 3:1.

Another possibility as shown in FIG. 5 is to have two pairs of apertures for each detector 17, the apertures of each pair being spaced with a pitch $e$ of nine-tenths or eleven-tenths the grating pitch, while the pairs are spaced apart with a "pair pitch$f$" of thirteen-fourteenths or fifteen-fourteenths of a grating pitch. This would eliminate the fifth and seventh harmonics. The third harmonic would be removed by the trapezium-shaped apertures or the rectangular apertures equal in width to one-third of the grating pitch.

FIGS. 4 and 5 use the same grating for simplicity.

I claim:

1. Apparatus for generating an approximation to a sine wave including an optical grating, a lamp for illuminating the grating, a reading head which is movable in relation to the grating and contains means defining two spaced local areas of the grating for examination, and a photocell means for examining the areas, the local areas being spaced apart by an odd number of $n^{th}$ fractional parts of half the pitch of the grating where $n$ is one of the integers 3,5,7 and 9.

2. Apparatus as claimed in claim 1 in which the grating consists of alternate lines and spaces or dark and light regions of approximately rectangular shape.

3. Apparatus as claimed in claim 1 in which the means defining the local areas comprises a pair of apertures.

4. Apparatus as claimed in claim 2 in which the local areas are of rectangular shape.

5. Apparatus as claimed in claim 4 in which the local areas have a width equal to one third of the pitch of the grating.

6. Apparatus as claimed in claim 5 in which $n = 5$.

7. Apparatus as claimed in claim 5 in which $n = 7$.

8. Apparatus as claimed in claim 1 in which the grating spaces or the local areas are each in the shape of a trapezium while the local areas or the grating spaces are each in the shape of a rectangle whose length is perpendicular to the parallel sides of the trapezium.

9. Apparatus as claimed in claim 8 in which the trapezium is symmetrical and its parallel sides have lengths in the ratio 1:3 the larger side being equal to the width of the rectangle.

10. Apparatus as claimed in claim 8 in which the spaces or local areas are in the shape of a double trapezium comprising a trapezium as defined together with its mirror image about one of the parallel sides.

11. Apparatus as claimed in claim 1 including $m$ groups of local areas of which the local areas in a group are spaced apart to eliminate the $n^{th}$ harmonic, the separate groups being spaced apart by a number of $q^{th}$ fractional parts of $1/n^{th}$ the pitch of the grating, and including means arranged to combine signals derived from examination of the local areas to provide a combined signal from which the $q^{th}$ harmonic of the fundamental frequency has been eliminated.

12. Apparatus as claimed in claim 9 in which the spaces or local areas are in the shape of a double trapezium comprising a trapezium as defined together with its mirror image about one of the parallel sides.